UNITED STATES PATENT OFFICE 1,977,446

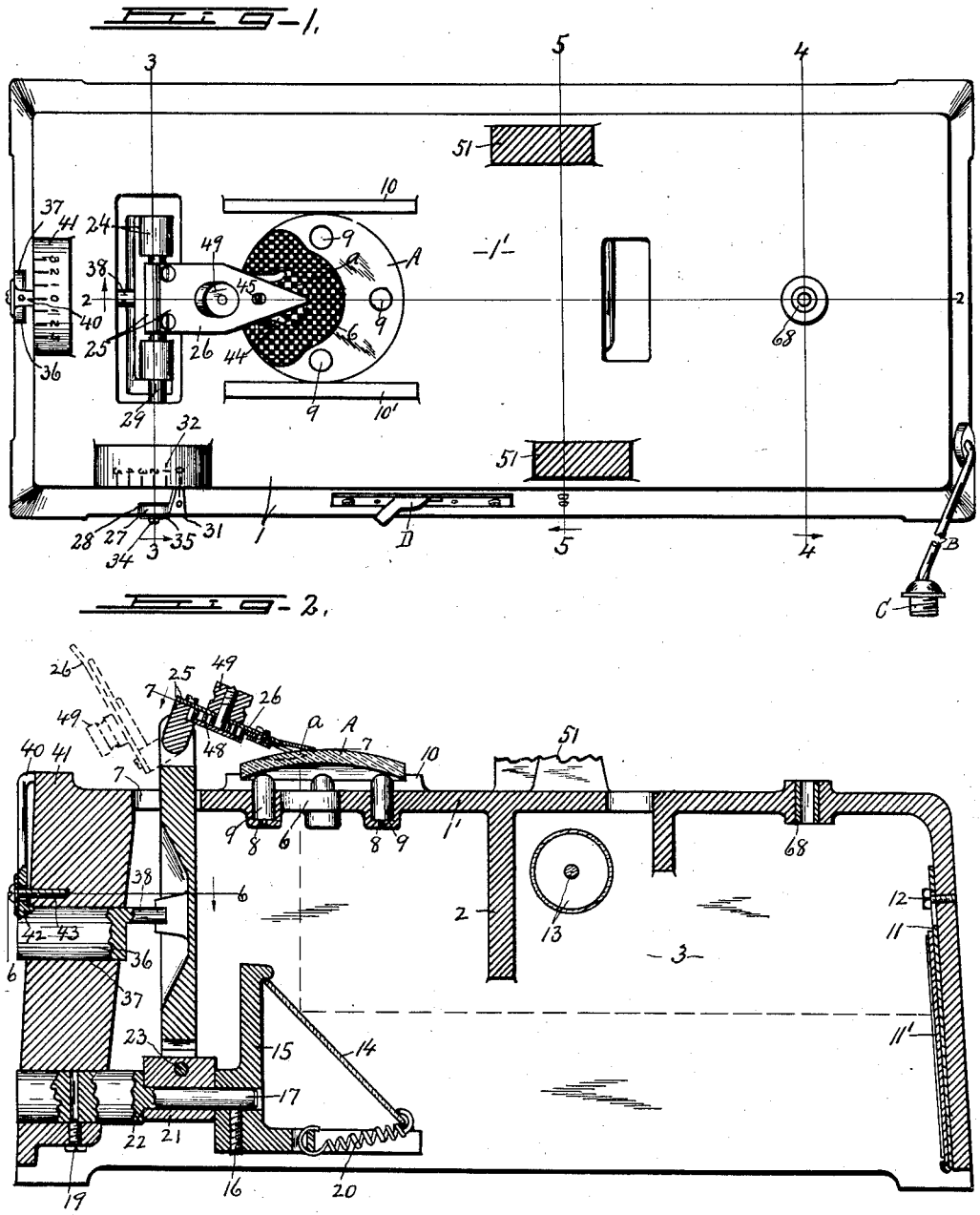

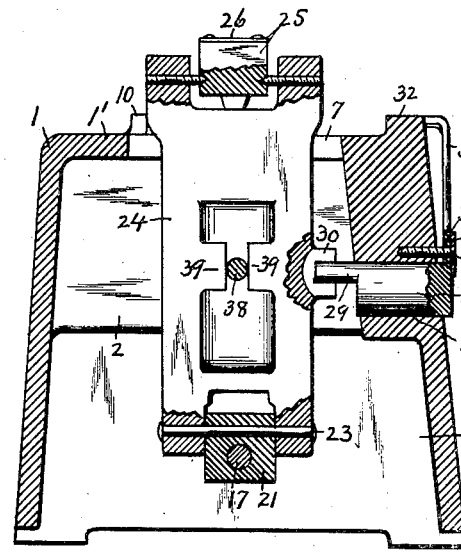

SEGMENT LOCATOR FOR BIFOCAL LENSES

Eli Maynard Long, Geneva, N. Y., assignor to Shuron Optical Company, Inc., Geneva, N. Y., a corporation of New York Original application April 27, 1928, Serial No. 273,384. Divided and this application October 18, 1929, Serial No. 400,591

11 Claims. (Cl. 88—56)

This invention relates to a machine for locating the relative positions of the segments, optical centers and axes of semi-finished bifocal lens-blanks according to certain prescriptions preparatory to finishing the lenses according to other coordinated prescriptions as may be required in the production of various forms of one-piece bifocal lenses as a division of my application resulting in Patent No. 1,929,534, October 10th, 1933.

The lens-blanks to be operated upon by this machine are preferably made in the form of circular bodies of suitable glass with the segments incorporated therein and one surface of the body ground and polished to the contour required for the finished lens leaving the other surface to be ground and polished to a certain prescribed contour coordinated with the previously finished contour in such manner that when the lens is cut from the blank, finished and mounted its optical properties will conform to certain predetermined prescriptions required to correct certain defects in the eyes of the user.

The main object of the present invention is to provide simple and efficient means for expeditiously locating the relative positions of the segments, optical centers and axes as they should appear in the finished lenses according to certain predetermined formula or prescriptions and at the same time to mark upon the finished surface of the lens-blank the desired positions of the optical centers and axes in their prescribed relation to the segments so that the marked lenses may be accurately positioned in the grinding and polishing machine for finishing the unfinished surface according to a prescribed formula.

The segments formed in the one piece bifocal lens-blanks even when one of the surfaces is finished are not always visually discernible and it would, therefore, be difficult to properly position the segment in the machine in proper relation to the marker without some means for producing a visual contrast between the segment and adjacent portions of the body of the lens-blank and one of the specific objects of this invention is to provide means whereby when the lens is placed in the machine the outline of the segment will be visually contrasted with the remaining portions of the blank by the use of an illuminated screen or target and a reflector so placed that the reflected light will pass through the segment and adjacent portion of the lens-blank and the portion of the target reflected through the segment will be considerably magnified over the portions of the target reflected through the remaining portions of the blank to more clearly define the outline of the segment.

Another object is to provide means whereby the mechanical center of the lens-blank may be accurately placed in the longitudinal plane of movement of the center pin of the marking device.

A further object is to provide a segment locator adjustable in one direction across the finished surface of the lens-blank to indicate the amount of "drop" of the segment relatively to the point of engagement of the center marking point with said surface and also adjustable in a different direction, preferably at right angles to the first-named adjustment, to indicate the degree of "inset" to one side or the other of the plane of movement of the center pin of the marker.

Another object is to enable the segment locator to be adjusted to and from the finished surface of the lens blank.

Other objects and uses relating to specific parts of the machine will be brought out in the following description.

In the drawings:—

Figure 1 is a top plan of a machine embodying the various features of my invention.

Figure 2 is a longitudinal vertical sectional view taken in the plane of line 2—2, Figure 1.

Figures 3, 4 and 5 are transverse vertical sectional views taken respectively in the planes of lines 3—3, 4—4 and 5—5, Figure 1.

Figure 6 is a detail sectional view taken in the plane of line 6—6, Figure 2.

Figure 7 is a top plan of the detached lens-segment locator, taken in the plane of line 7—7, Figure 2.

As illustrated, this machine comprises a main supporting frame or housing 1 upon which is mounted a support for the lens-blank, a gage to which the lens-blank may be set preparatory to positioning its segment relatively to said prescribed optical center and axis as determined by the marking points, illuminated means for visually locating the segment in the blanks, a segment locator or gage to which the segment of the lens-blank may be set to determine the amount of "drop" or "inset" of the segment relatively to the optical center according to certain prescribed formula and a marker mechanism by which the prescribed optical centers and axes may be impressed upon the finished surface of the lens-blank.

Frame or housing

The main supporting frame or housing is preferably made in the form of an inverted box-like structure open at the bottom with suitable ventilating spaces and provided with a substantially horizontal top shelf or work-table 1' with downwardly extending marginal flanges around the four sides thereof, the lower faces of the corners of the frame being also disposed in a substantially horizontal plane so as to rest solidly upon a bench support.

The frame is substantially rectangular in top plan and elongated in one direction and is provided intermediate its ends with a partition 2 extending downwardly from the top wall 1' approximately half the vertical height of the frame thereby dividing the upper portion of the interior of the housing rear and front compartments 3 and 4 for receiving the light-producing and target reflecting mediums hereinafter described.

The top wall of the rear compartment 3 is provided with a ventilating opening 5 adjacent the source of light to relieve said compartment from excessive heat.

The top wall of the front compartment 4 is provided with a sight opening 6 directly over the light-reflecting medium to allow the reflected rays of light to pass upwardly therethrough, said top wall of the compartment 4 being also provided with an additional opening 7 in front of the opening 6 for receiving a movable part of the segment-locator, presently described.

*Supporting means for the lens-blank*

The top wall of the compartment 4 is provided with a series of, in this instance four, vertical sockets 8 arranged in uniformly spaced relation circumferentially about a common axis which, in this instance, is located in the longitudinal center of the top wall of the housing and is coincident with the center marking point of the marker when the latter is moved to the position for marking the lens, two of said sockets being located in the longitudinal center of the top of the frame while the other two are located in a plane at right angles to and at opposite sides of said longitudinal center.

Seated in these sockets are a corresponding number of resilient posts 9 of soft rubber or equivalent material having their upper ends projecting uniform distances above the upper surface of the top 1' of the frame for receiving and supporting the lens blank as A to be marked, said resilient posts serving the double purpose of reducing the liablity of breakage of the lens-blank in contact therewith and also for frictionally holding the blank against movement when positioned for marking.

In some instances, as for example, in the "Kryptok" lens, the segment is preferably fused in the convex side of the blank and the blank is usually circular and of predetermined diameter, while in other instances, as for example, in the "Ultex" lens the segment is preferably ground in the concave side of the blank and the latter is usually rectangular on three of its sides and circular on its fourth side and of standardized form and size.

In each case, however, the segment side of the blank is prefinished to the required contour preparatory to marking and during the marking operation the blank is supported upon the posts 9 with its unfinished surface in contact with the upper ends of the posts.

In order that the lens-blank together with its segment may be properly positioned upon the posts for marking, the top wall 1' of the frame 1 is provided with one or more stop gages 10 extending longitudinally thereof at one or both sides of the sight opening 6 a distance from the axis around which the posts 9 are arranged substantially equal to one-half the width or diameter of the lens-blank so that the lens blank may be moved by hand across and upon the upper ends of the post 9 to bring its perimeter in approximate alinement with the gages 10 thereby assuring the maintenance of the center of the blank in the longitudinal center of the top wall 1' of the housing and in the vertical plane of movement of the center pin of the marker.

*Illuminated segment locator*

A target holder 11 having a target 11' is secured by a screw 12 or equivalent fastening means to the inner face of the rear end wall of the frame 1 so that the target may face forwardly, the inner face of said target being divided into a multiplicity of relatively small squares, adjacent ones of which are contrasted in color somewhat in the manner of a checker board.

An incandescent electric lamp 13 or equivalent source of light is placed in the upper front portion of the compartment 3 between the top wall of said compartment and the horizontal plane of the lower edge of the partition 2 for the purpose of the illuminating of the front face of the target 11 and preventing the direct rays from passing to the reflector, presently described.

A light reflector 14 is mounted upon a suitable supporting frame 15 within the lower front portion of the front compartment 4 and directly below the sight opening 6, said reflector being disposed at an angle of substantially forty-five degrees with its reflecting side facing the target 11' so that the illuminated target will be reflected through the sight opening 6 and thence through the overlying portion of the lens blank A under which conditions the portion of the reflected target included in the area of the segment *a* of the lens-blank will be more or less magnified over those portions of the target which are reflected to the remaining portions of the lens blank thereby making a visual distinction or contrast between those parts to more clearly visually outline the segment.

This contrast is further augmented by the contrasting colors in the squares of the target but obviously various other forms of target might be used without departing from the spirit of this invention.

The bracket 15 is secured by a set screw 16 to the inner end of a stud 17 having its outer end secured by a screw 19 in an opening in the front end wall of the housing 1 as shown more clearly in Figure 2.

A spring 20 is operatively connected to the lower front edge of the mirror 14 and to the bracket 15 for holding the mirror in its operative position and permitting it to be removed or replaced when desired.

The stud 17 is disposed in substantially the vertical plane of the longitudinal center of the housing 1 and, therefore, in substantially the plane of movement of the center marking pin.

*Lens segment locator*

A yoke member 21 is journaled upon the stud 17 between the relatively stationary bracket 15 and a shoulder 22 on said stud directly in front of the front end wall of the housing and upon this yoke member is pivoted at 23 the lower end of an upwardly extending lever 24 having its upper end projecting through the opening 7 in the top wall of the compartment 4 in front of the sight opening 6.

The pivotal pin 23 is disposed at right angles to the axis of the stud 17 to permit front and rear rocking movement of the lever while the pivotal mounting of the yoke member 21 upon the stud 17 permits the lever and yoke member to rock in unison about the axis of the stud.

This compound movement in directions at right angles to each other is utilized in locating the amount of prescribed "drop" and "inset" of the lens segment relatively to the optical center and axis of the finished lens according to predetermined prescriptions.

The upper end of the lever 24 above the top wall of the compartment 4 is bifurcated for receiving one of the arms of a bell-crank-lever 25, said arm of the bell-crank-lever being provided with opposite laterally projecting coaxial bearings journaled on screw 24' in the opposite arms of the upper end of the lever 24 to permit the bell-crank-lever to swing about an axis parallel with the axis of the pivotal pin 23 or at right angles to the axis of the stud 17.

This bell-crank-lever is provided with a rearwardly projecting plate 26 having its rear end pointed and adapted to be moved into and out of engagement with the upper surface of the lens-blank to be marked.

The means for effecting the forward and rearward movement of the lever 24 comprises, in this instance, a rock shaft 27, Figure 3, journaled in a bearing or opening 28 in one side, preferably the right hand side, of the frame 1 to rotate about an axis parallel with the pivotal pin 23, said rock shaft having its inner end provided with an eccentric bearing pin 29 adapted to enter between and engage a pair of opposed lugs 30 on the adjacent upright edge of the lever 24, whereby the rocking movement of the shaft 27 in reverse directions will effect a corresponding oscillating movement of the lever and parts carried thereby.

The outer end of the rock shaft 27 is provided with an upwardly extending pointer 31, the free end of which is movable along a graduated scale 32 on the upper face of the adjacent side of the frame 1, as shown more clearly in Figure 1, said graduations varying in value from zero up and representing in millimeters the amount of drop of the lens segment below the optical center of the finished lens according to prescribed formula.

The portion of the arm 31 between the axis of the rock shaft 27 and free end of the pointer is provided with a transverse slot 33 concentric with the axis of the shaft 27 for receiving a screw 34 having a head 35 adapted to engage the outer face of the pointer so that when tightened the free end of the pointer will be frictionally held against the adjacent side face of the frame 1 against accidental displacement.

The lever 24 and pointer plate 26 are so relatively arranged that when the pointer 31 is set to its zero position the free end of the pointer plate 26 will be in the vertical plane of the axis of the opposite side posts 9 which will also be in the vertical plane of contact of the center marking pin when the marker is moved to its marking position.

It, therefore, hollows that when movement of the pointer 31 and resultant movement of the lever 24 from the zero position will cause a corresponding movement of the point of the plate 26 from the transverse plane of the axes of the side posts 9 and marking point of the center pin of the marker, the degree of adjustment from the zero position representing millimeters and is made according to a prescribed formula.

The means for effecting the transverse adjustment of the lever 24 and pointer plate 26 carried thereby for indicating the amount of inset of the segment relatively to the marking point of the centerpin of the marker and incidentally relatively to the vertical plane of the axes of the front and rear posts 9 comprises a rock shaft 36 journaled in an opening 37 in the front end wall of the frame 1 with its axis parallel with and in the vertical plane of the axis of the stud 17 and, therefore, at right angles to the axis of the rock shaft 27, the inner end of said rock shaft 36 being provided with an eccentric pin 38 interposed between and in engagement with a pair of laterally spaced lugs 39 on the lever 24, as shown more clearly in Figures 2 and 3.

The outer end of the rock shaft 36 is provided with a pointer 40 movable along a graduated scale 41 on the upper surface of the adjacent end wall of the frame 1, said scale being graduated in opposite directions from a zero position to indicate progressively increasing values in millimeters and thereby to determine the amount of "inset" of the lens-segment with reference to the longitudinal center of the machine or longitudinal vertical plane of movement of the center pin of the marker.

The pivotal connection of the bell-crank-lever 25 with the upper end of the lever 24 permits the pointer plate 26 to be moved from the position shown by full lines in contact with the upper surface of the lens-blank, as shown in Figure 2, to the position shown by dotted lines in the same figure or to opposite sides in the vertical plane of its axis where it is self-supporting in either position.

The pointer arm 40 is provided intermediate its ends with a transverse slot 42 for receiving a screw 43 which engages in a threaded aperture in the adjacent end wall of the frame 1 and has its outer end provided with a head engaging the outer face of the pointer arm for frictionally holding the latter in engagement with the adjacent end face of the frame against accidental movement from its adjusted position.

A pair of laterally opposed caliper levers 44 are pivoted intermediate their ends at 45 to the pointer plate 26 at opposite sides of the longitudinal center thereof and to extend forwardly and rearwardly from their respective pivots, as shown in Figure 9.

The rear arms of these levers 44 are of equal length and terminate in outwardly projecting points 46 which are located in a transverse plane a distance from the point of the member 26 substantially equal to the radius of the lens segment so that the three points may be positioned to register with three points in the circumference of said segment as shown in Figures 1 and 9.

The front arms of the levers 44 are of equal length and are provided with pins 47 engaged by a rotary cam 48 which is journaled on the underside of the intermediate portion of the pointer plate 26 and is provided with an exposed handle 49 by which the cam may be rotated for simultaneously moving the levers 44 through equal arcs in opposite directions about their respective pivots, the object of which is to bring the points 46 in registration with the periphery of the segment a.

Current may be supplied to the lamp 13 from any available source of power through a cable B having the conventional electric plug C adapted to be connected to any standard form of socket, the light circuit including therein a switch D mounted upon and within the housing 1.

Operation

The amount of "drop" and also the amount of "inset" relatively to the optical center of the finished lens and the angle of the major optical axis relatively to the mechanical axes of the finished lens being predetermined by a certain formula, the semi-finished blank is placed by hand upon the upper ends of the resilient posts 9 with its unfinished surface in contact therewith and its finished surface at the top.

The hand lever 31 may then be adjusted along the scale 32 to the graduation indicating the prescribed amount of drop of the lens segment below the optical center, after which the hand lever 40 may be adjusted along its scale 41 to one side or the other of the zero graduation to register with the graduation corresponding to the prescribed amount of inset, the graduation at one side of the zero mark being used for right eye lenses and those of the other side for left eye lenses.

These movements of the levers or pointers 31 and 40 cause corresponding movements of the pointer plates 26 and parts carried thereby, previously termed the segment locator, through the medium of the eccentric pins 28 and 38 on lever 24.

Now, assuming that the lamp 13 is energized by the closing of the switch D then the direct rays of light transmitted to the target 11′ will be reflected by the reflector 14 upwardly through the sight opening 6 and overlying portion of the lens A and particularly through the segment A to render the latter more clearly visible.

The pointer plate 26 is then rocked rearwardly to engage its points with the upper surface of the lens blank after which the points 44 may be adjusted by the rotation of the handle 49 to correspond to the diameter of the lens segment which is then moved by hand upon the posts 9 with its periphery in alinement with the gage 10′ or against the stop 10 until the point of the plate 26 and points 44 of the segment locator are visually registered with three points in the periphery of the segment as previously explained thereby bringing the segment into proper position relative to the marking point of the center pin 62 representing the optical center of the finished lens.

The lens blank after being marked may be removed from the marking machine and placed upon the lap of a suitable grinding and polishing machine with the marked axis registered with the axial length of the lap, the unfinished surface of the lens blank being then ground and polished to the required contour such, for example, as a cylindrical surface for producing toric lenses.

When the lens blank is quadrilateral or more or less irregular in form and the segment is ground in the finished concave surface thereof the blank is placed on the posts with its convex surface in contact therewith and owing to the upward inclination of the marginal edges of the blank on the post it is free to shift laterally over the top of the gage 10 and in this case the top wall 1′ of the frame 1 would be provided with an extra gage as 10′, the same distance from the center around which the posts are arranged and parallel with the gage 10 but preferably of less vertical height so that the lens may shift laterally across the upper surfaces of both gages when locating the position of the segment relatively to the marking point of the center marking pin of the marker which it will be remembered is coincident with the center point around which the posts are arranged.

Although the machine shown and described is particularly simple in construction and operation it is evident that various changes may be made in the detail construction without departing from the spirit of this invention.

What I claim is:

1. In a segment locator for bifocal lenses, a work table having a sight opening therethrough, means for supporting a lens movably on the table across the opening to enable its segment to be brought into vertical alinement with the opening, a target, means for reflecting the image of the target through the opening to the lens and means movable at will across the surface of the lens for locating the position of the segment relatively to the center of the lens.

2. In a segment locator for bifocal lenses, a work table provided with a sight opening therethrough, lens-supporting posts mounted on said top portion around the opening and upon which the lens is movably supported to bring its segment into vertical alinement with the opening, a target, means for reflecting the image of the target through the opening to the lens and a segment finder movable at will upon the surface of the lens toward and from the center for determining the position of the segment relatively to said center.

3. In a device for positioning bifocal lenses preparatory to marking, a housing having a horizontally disposed top portion provided with a sight opening therethrough, lens-supporting posts mounted on said top portion around the opening and upon which the lens is movably supported to bring its segment into vertical alinement with the opening, a target supported within the housing at one side of the opening, a mirror supported within the housing and arranged to reflect the image of the target through the opening to the lens, an electric incandescent lamp arranged within the housing to project its light rays onto the target, and means within the housing for preventing the passage of direct rays of light from the lamp to the mirror and to said opening.

4. In a segment locator for bifocal lenses, the combination with a lens-support having a sight opening across which the lens is movably positioned to register the segment and adjacent portions of the lens with said opening, and means for projecting light through the opening to the portions of the lens registering therewith whereby the segment may be visually distinguished from the remaining portions of the lens, of means movable across the surface of the lens into registration with certain portions of the segment for determining the position of said segment relatively to the center of the lens.

5. In a segment locator for bifocal lenses, the combination with a lens-support having a sight opening across which the lens is movably positioned to register the segment and adjacent portions of the lens with said opening, and means for projecting light through the opening to the portions of the lens registering therewith whereby the segment may be visually distinguished from the remaining portions of the lens, of a pointer movably engaging the surface of the lens, and means operable at will for moving the pointer into registration with a predetermined portion of the segment to determine the position of the segment relatively to certain other portions of the lens.

6. In a segment locator for bifocal lenses, the combination with a lens-support having a sight opening across which the lens is movably positioned to register the segment and adjacent portions of the lens with said opening, and means for projecting light through the opening to the portions of the lens registering therewith whereby the segment may be visually distinguished from the remaining portions of the lens, of a pointer movably engaging the surface of the lens, and means operable at will for effecting a compound movement of the pointer in different directions across the surface of the lens for locating the position of the segment relatively to the center of the lens.

7. In a segment locator for bifocal lenses, the combination with a lens-support having a sight opening across which the lens is movably positioned to register the segment and adjacent portions of the lens with said opening, and means for projecting light through the opening to the portions of the lens registering therewith whereby the segment may be visually distinguished from the remaining portions of the lens, of a pointer movably engaging the surface of the lens, and means operable at will for effecting a compound movement of the pointer in different directions across the surface of the lens for locating the position of the segment relatively to the center of the lens, said pointer being movable at will into and out of engagement with the lens surface.

8. In a segment locator for bifocal lenses, the combination with a lens-support having a sight opening across which the lens is movably positioned to register the segment and adjacent portions of the lens with said opening, and means for projecting light through the opening to the portions of the lens registering therewith whereby the segment may be visually distinguished from the remaining portions of the lens, of a pointer movably engaging the surface of the lens, means operable at will for effecting a compound movement of the pointer in different directions across the surface of the lens for locating the position of the segment relatively to the center of the lens, and separate devices for indicating the amount of movement of the pointer in different directions from a predetermined position.

9. In a segment locator for bifocal lenses, the combination with a lens-support having a sight opening across which the lens is movably positioned to register the segment and adjacent portions of the lens with said opening, of a device movably engaged with the surface of the positioned lens and provided with a plurality of pointers adapted to register with different portions of the segment, and means operable at will for effecting a compound movement of said device in different directions while engaged with the lens to cause the registration of said pointers with the different portions of the segment.

10. In a segment locator for bifocal lenses, the combination with a lens-support having a sight opening across which the lens is movably positioned to register the segment and adjacent portions of the lens with said opening, of a device movably engaged with the surface of the positioned lens and provided with three pointers adapted to register with different points in the perimeter of the segment, two of said pointers being adjustable toward and from the third pointer to correspond to segments of different widths, and means operable at will for effecting a compound movement of said device in different directions while the pointers are in operative position for registering said pointers with their respective points in said perimeter.

11. In a segment locator for bifocal lenses, a lens support having a sight opening across which the lens is movably positioned to register the segment and adjacent portions of the lens therewith, a target, a mirror arranged to reflect an image of the target through the opening to the registering portion of the lens, a support for the mirror, a yoke journaled on said support to rock in reverse directions, a lever pivoted to the yoke to rock about an axis at right angles to the axis of movement of the yoke, means for rocking the yoke and lever about their respective axes, and a pointer on the lever arranged to move across the surface of the lens as the yoke and lever are rocked about their respective axes to enable the pointer to be brought into registration with a predetermined point in the perimeter of the segment while the lens is positioned on its support.

ELI MAYNARD LONG.